US011341876B2

(12) United States Patent
He et al.

(10) Patent No.: US 11,341,876 B2
(45) Date of Patent: May 24, 2022

(54) WHITE BALANCE ADJUSTING SYSTEM FOR DISPLAY DEVICE AND ADJUSTING METHOD THEREOF

(71) Applicant: TCL China Star Optoelectronics Technology Co., Ltd., Guangdong (CN)

(72) Inventors: Guanxian He, Guangdong (CN); Yuhong Fu, Guangdong (CN)

(73) Assignee: TCL China Star Optoelectronics Technology Co., Ltd., Guangdong (CN)

(*) Notice: Subject to any disclaimer, the term of this patent is extended or adjusted under 35 U.S.C. 154(b) by 262 days.

(21) Appl. No.: 16/622,428

(22) PCT Filed: Aug. 21, 2019

(86) PCT No.: PCT/CN2019/101784
§ 371 (c)(1),
(2) Date: Dec. 13, 2019

(87) PCT Pub. No.: WO2021/003808
PCT Pub. Date: Jan. 14, 2021

(65) Prior Publication Data
US 2022/0005422 A1 Jan. 6, 2022

(30) Foreign Application Priority Data
Jul. 5, 2019 (CN) ......................... 201910602214.9

(51) Int. Cl.
*H04N 9/73* (2006.01)
*G09G 3/00* (2006.01)
*G09G 3/36* (2006.01)

(52) U.S. Cl.
CPC ............... *G09G 3/006* (2013.01); *G09G 3/36* (2013.01); *G09G 2320/0233* (2013.01); *G09G 2320/0666* (2013.01); *G09G 2360/145* (2013.01)

(58) Field of Classification Search
CPC .. G09G 3/006; G09G 3/36; G09G 2320/0233; G09G 2320/0666; G09G 2360/145; G09G 3/20; G09G 3/3607
See application file for complete search history.

(56) References Cited

U.S. PATENT DOCUMENTS 5,422,998 A * 6/1995 Margolin ................ G06T 11/40 711/201
6,075,514 A * 6/2000 Ryan .................... H04N 1/6019 382/167

(Continued)

FOREIGN PATENT DOCUMENTS

CN 103021367 A 4/2013
CN 104809974 A 7/2015

(Continued)

*Primary Examiner* — Jose R Soto Lopez
(74) *Attorney, Agent, or Firm* — Taft Stettinius & Hollister LLP

(57) ABSTRACT

A white balance adjusting system for a display device includes a control member including a register storing white balance control commands and a preset white balance lookup table. A built-in self-test module is coupled to the control member and configured to store a test pattern. A first storage element is disposed in the display device. An optical sensor is configured to measure brightness and chroma data of the screen according to the test pattern. An external control device is operated by the control member to execute the white balance control commands so that white balance adjustment is implemented according to the preset white balance lookup table and the brightness and the chroma data of the screen, and a corrected white balance lookup table is (Continued)

produced. The corrected white balance lookup table is stored in the first storage element and provided to update the preset white balance lookup table.

8 Claims, 3 Drawing Sheets

(56) References Cited

U.S. PATENT DOCUMENTS

| | | | | |
|---|---|---|---|---|
| 10,835,105 | B1 * | 11/2020 | Huang | A61B 1/2676 |
| 11,176,867 | B2 * | 11/2021 | Yang | G09G 3/3208 |
| 2004/0001074 | A1 * | 1/2004 | Oyaizu | G06T 15/10 345/629 |
| 2006/0044295 | A1 * | 3/2006 | Yu | G09G 3/2096 345/204 |
| 2007/0013626 | A1 * | 1/2007 | Ando | G09G 3/3406 345/88 |
| 2007/0064117 | A1 * | 3/2007 | Nakai | H04N 5/35536 348/222.1 |
| 2007/0106835 | A1 * | 5/2007 | Lin | G06F 8/65 711/103 |
| 2008/0012958 | A1 * | 1/2008 | Wu | H04N 9/73 348/E9.051 |
| 2008/0165292 | A1 * | 7/2008 | Bing | H04N 9/3194 348/744 |
| 2010/0085338 | A1 * | 4/2010 | Miguchi | G02F 1/133609 345/207 |
| 2011/0157409 | A1 * | 6/2011 | Adachi | G09G 5/00 348/222.1 |
| 2012/0026339 | A1 * | 2/2012 | Kojima | H04N 5/332 348/E5.09 |
| 2012/0127324 | A1 * | 5/2012 | Dickins | G09G 3/006 348/191 |
| 2012/0176358 | A1 * | 7/2012 | Kaji | G09G 3/20 345/207 |
| 2012/0188265 | A1 * | 7/2012 | Suzuki | G09G 5/06 345/589 |
| 2012/0206478 | A1 * | 8/2012 | Nakamura | G09G 5/06 345/589 |
| 2012/0206654 | A1 * | 8/2012 | Nakamura | H04N 17/04 348/E9.051 |
| 2012/0299974 | A1 * | 11/2012 | Park | G09G 3/3688 345/690 |
| 2013/0016119 | A1 * | 1/2013 | Ukawa | G09G 5/005 345/589 |
| 2013/0027438 | A1 * | 1/2013 | Hu | G09G 3/3413 345/690 |
| 2013/0050504 | A1 * | 2/2013 | Safaee-Rad | G09G 3/2003 348/181 |
| 2013/0155121 | A1 * | 6/2013 | Kang | G01J 3/506 345/690 |
| 2013/0314436 | A1 * | 11/2013 | Nakamura | G09G 5/06 345/601 |
| 2014/0152706 | A1 * | 6/2014 | Park | G09G 3/2003 345/690 |
| 2014/0240533 | A1 * | 8/2014 | Hirooka | H04N 9/646 348/223.1 |
| 2015/0092080 | A1 * | 4/2015 | Maruyama | H04N 5/23206 348/223.1 |
| 2015/0138260 | A1 * | 5/2015 | Yamakawa | G09G 3/2003 345/694 |
| 2015/0269901 | A1 * | 9/2015 | Kobayashi | G09G 3/3696 345/212 |
| 2016/0117974 | A1 * | 4/2016 | Back | G09G 3/3275 345/213 |
| 2018/0247613 | A1 * | 8/2018 | Lee | G09G 5/14 |
| 2018/0299376 | A1 * | 10/2018 | Cooper | G01N 33/543 |
| 2019/0108798 | A1 * | 4/2019 | Ishihara | G09G 3/34 |
| 2019/0189038 | A1 * | 6/2019 | Park | G09G 3/006 |
| 2019/0251929 | A1 * | 8/2019 | Fossati | G09G 3/2003 |
| 2020/0090604 | A1 * | 3/2020 | Chen | G09G 3/36 |
| 2020/0098147 | A1 * | 3/2020 | Ha | G06T 11/001 |
| 2020/0184924 | A1 * | 6/2020 | Azam | G01J 3/506 |
| 2020/0211457 | A1 * | 7/2020 | Kim | G09G 3/3233 |
| 2020/0365113 | A1 * | 11/2020 | Chen | G09G 5/02 |
| 2021/0005159 | A1 * | 1/2021 | Zhang | G09G 5/02 |
| 2021/0065622 | A1 * | 3/2021 | Chu | G09G 3/20 |
| 2021/0065641 | A1 * | 3/2021 | He | G09G 3/3655 |
| 2021/0201831 | A1 * | 7/2021 | Woo | G09G 3/3291 |

FOREIGN PATENT DOCUMENTS

| | | | |
|---|---|---|---|
| CN | 106384580 | A | 2/2017 |
| CN | 106652962 | A | 5/2017 |

* cited by examiner

WHITE BALANCE ADJUSTING SYSTEM FOR DISPLAY DEVICE AND ADJUSTING METHOD THEREOF

CROSS-REFERENCE TO RELATED APPLICATIONS

This application is a U.S. National Phase of International PCT Application No. PCT/CN2019/101784 filed Aug. 21, 2019, which claims the benefit of Chinese Patent Application Serial No. 201910602214.9 filed Jul. 5, 2019, the contents of each application are incorporated herein by reference in their entirety.

BACKGROUND OF INVENTION

1. Field of Invention

The present invention relates to a technical field of displays, and particularly to, a white balance adjusting system for a display device and an adjusting method thereof.

2. Related Art

Today's displays are dominated by flat panel displays, among which liquid crystal displays are the earliest and most widely used flat panel displays. The liquid crystal displays mainly include array substrates configured with thin-film transistors, color filter substrates (also referred to as color film substrates), and liquid crystal layers having liquid crystal molecules injected between the array substrates and the color filter substrates. In a modularized process, an assembly of panels and backlight modules, panel driver circuits, and outer frames are all assembled as a unitary piece. The backlight modules are configured to provide a light source, the array substrates are configured to control and provide voltages to the liquid crystal layers, and the color filter substrates are used in combination with the others to present color images. However, white color displayed by conventional liquid crystal displays is prone to color cast, that is, color temperatures deviate from white points, especially in low gray levels.

In order to adjust lookup tables for corresponding models of liquid crystal displays, a conventional method is provided to output specific patterns using pattern generators (PGs), and to use optical sensors to obtain white balance information. Then, adjust the lookup tables by manual or automatic algorithm until the most suitable lookup table data is found. However, the manner in which the pattern generators output specific patterns increases complexity of an entire adjustment system, and the pattern generators are not products always operating stably, and are easily damaged under high-intensity use. In addition, each model of conventional liquid crystal displays is only applicable to a same white balance lookup table, and therefore it is not likely to achieve a best adjustment for each model of displays. If automatic white balance adjustment systems with pattern generators are introduced into production lines, costs of the entire systems and the complexity of production line processes will both increase accordingly.

SUMMARY OF INVENTION

An object of the present application is to provide a white balance adjusting system for a display device and an adjusting method thereof, capable of performing white balance adjustment on the display device through an external device, without additionally using a pattern generator in the white balance adjusting system, thereby simplifying apparatuses required for the white balance adjusting system, improving adjusting efficiency, and being applicable to production lines.

To achieve the above-mentioned object, the present application provides a white balance adjusting system for a display device, the white balance adjusting system connected to an external control device and comprising: a control member disposed in the display device, wherein the control member comprises a register storing white balance control commands and a preset white balance lookup table; a built-in self-test module coupled to the control member and configured to store a test pattern; a first storage element disposed in the display device; and an optical sensor attached to a side surface of a screen of the display device and configured to measure brightness and chroma data of the screen according to the test pattern; wherein the external control device is operated by the control member to execute the white balance control commands so that white balance adjustment is implemented according to the preset white balance lookup table and the brightness and the chroma data of the screen, so that a corrected white balance lookup table is produced, wherein the corrected white balance lookup table is stored in the first storage element.

In one aspect of the present application, the white balance adjusting system further comprises a second storage element, wherein the corrected white balance lookup table is written to the second storage element through the first storage element, and the corrected white balance table is provided to update the preset white balance lookup table stored in the register.

In another aspect of the present application, the control member is a timing controller chip, the first storage element is a flash memory or an electrically erasable programmable read only memory, and the second storage element is a static random-access memory.

In another aspect of the present application, the test pattern stored in the built-in self-test module comprises a plurality of single solid color pictures each have a gray level different from each other and fully fill the screen.

In another aspect of the present application, the plurality of single solid color pictures comprise a red picture, a green picture, a blue picture, and a white picture.

In another aspect of the present application, each of the red picture, the green picture, and the blue picture has a 10-bit color depth.

The present application further provides a white balance adjusting method for a display device, comprising disposing a control member, a first storage element, and a built-in self-test module in the display device, wherein the control member comprises a register storing white balance control commands and a preset white balance lookup table, and the built-in self-test module is configured to store a test pattern; connecting the display device to an external control device; controlling, using the external control device, the control member and the built-in self-control module so that the built-in self-test module is enabled to output the test pattern to a screen of the display device through the control member; measuring, using an optical sensor attached to a side surface of the screen, brightness and chroma data of the screen displaying the test pattern; executing the white balance control commands through the control member, so that white balance adjustment is implemented according to the preset white balance lookup table and the brightness and the chroma data of the screen; and producing a corrected white balance lookup table through the control member, and storing the corrected white balance lookup table in the first storage element; wherein the corrected white balance table is provided to update the preset white balance lookup table stored in the register.

In one aspect of the present application, the white balance control commands comprise turning on or turning off white balance adjustment functions; reading out the preset white balance lookup table in the register; adjusting gray level of the test pattern output by the control member; writing the corrected white balance lookup table to the second storage element; storing the corrected white balance lookup table of the second storage element to the register, so that the preset white balance lookup table in the register is updated with the corrected white balance lookup table; and writing the corrected white balance lookup table updated in the register to the first storage element.

The present application further provides a white balance adjusting system for a display device, the white balance adjusting system connected to an external control device and comprising a control member disposed in the display device, wherein the control member comprises a register storing white balance control commands and a preset white balance lookup table; a built-in self-test module coupled to the control member and configured to store a test pattern, wherein the test pattern comprises a plurality of single solid color pictures each have a gray level different from each other and fully fill the screen; a first storage element disposed in the display device; a second storage element; and an optical sensor attached to a side surface of a screen of the display device and configured to measure brightness and chroma data of the screen according to the test pattern; wherein the external control device is operated by the control member to execute the white balance control commands so that white balance adjustment is implemented according to the preset white balance lookup table and the brightness and the chroma data of the screen, so that a corrected white balance lookup table is produced, wherein the corrected white balance lookup table is stored in the first storage element and is written to the second storage element through the first storage element, and the corrected white balance table is provided to update the preset white balance lookup table stored in the register.

Based on the white balance adjusting system and the white balance adjusting method for the display device of the present application, a solid color picture is output by the control member of the control module (i.e. timing controller, TCON) under control of the external control device, and the built-in self-test module, and so on, to be measured by the optical sensor, so that gray levels of a red picture, a green picture, and a blue picture of the test pattern can be adjusted according to the preset white balance lookup table, thereby to produce the corrected white balance lookup table replacing the preset white balance lookup table as originally provided, and enabling a more accurate white balance adjustment in the next time. Particularly, a conventional pattern generator is not needed in the white balance adjusting system of the present application to output a specific pattern for measurement, so that the white balance adjusting system can be simplified, hardware costs can be reduced, time spent on adjustment can be reduced, and the white balance adjusting system can further be introduced to production lines, so that white balance adjustment can be performed on each of display panels of different models, no longer limited to a same model only suitable for a unique white balance lookup table, thus ensuring display quality of each of the display panels.

DESCRIPTION OF PREFERRED EMBODIMENTS

The following embodiments are referring to the accompanying drawings for exemplifying specific implementable embodiments of the present invention. Directional terms described by the present invention, such as upper, lower, front, back, left, right, inner, outer, side, etc., are only directions by referring to the accompanying drawings, and thus the used directional terms are used to describe and understand the present invention, but the present invention is not limited thereto.

The present application relates to a white balance adjusting system and a white balance adjusting method for a display device, wherein the display device is a liquid crystal display device having a conventional liquid crystal display structure, such as an array substrate, a color filter substrate, a liquid crystal layer disposed between the array substrate and the color filter substrate, and a backlight module (not shown). Therefore, detailed structures of the liquid crystal display device are not reiterated herein.

Figure 1:
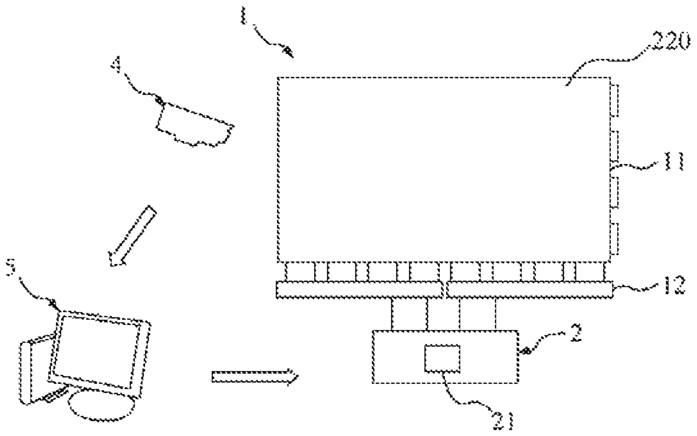
FIG. 1 is a schematic view showing a white balance adjusting system for a display device of an embodiment of the present application.
Figure 2:
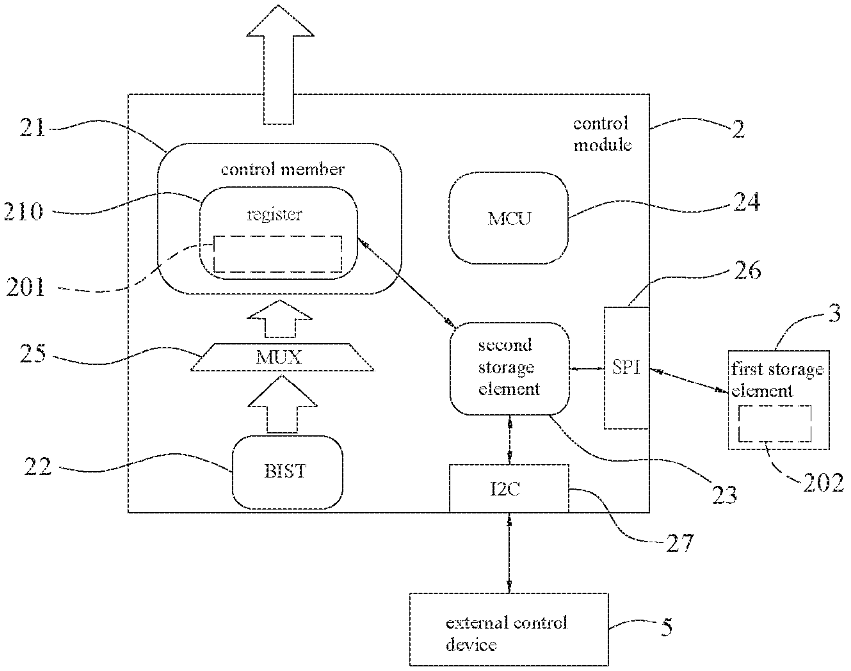
FIG. 2 is a schematic functional view of a control module of an embodiment of the present application.

FIG. 1 is a schematic view showing a white balance adjusting system for a display device of an embodiment of the present application. As shown in FIG. 1, the white balance adjusting system of the display device 1 includes a control member 21, a first storage element 3 (as shown in FIG. 2), an optical sensor 4, and an external control device 5. The control member 21 is integrated on a control module 2, wherein the control module 2 is connected to a display panel 11 of the display device 1 through a circuit board 12 in an X-axes. The control member 21 is a timing controller (TCON) chip. The first storage element 3 may be a flash memory or an electrically erasable programmable read only memory (EEPROM).

FIG. 2 is a schematic functional view of a control module of an embodiment of the present application. The control module 2 is integrated with the control member 21, a built-in self-test module 22, a second storage element 23, a microcontroller unit (MCU) 24, and a multiplexer (MUX) 25, wherein the second storage element 23 may be a static random-access memory (SRAM). Specifically, the second storage element 23 is electrically connected to the first storage element 3 via a serial peripheral interface (SPI). The second storage element 23 is coupled to an inter-integrated circuit (I2C). The built-in self-test module 22 has a built-in self-test function and is coupled to the control member 21 through the MUX 25.

Please continue referring to FIG. 2. The control member 2 includes a register 210 storing white balance control commands and a preset white balance lookup table 201, wherein the built-in self-test module 22 is configured to store a test pattern 220 (as shown in FIG. 1). Particularly, the test pattern 220 includes a plurality of single solid color pictures each have a gray level different from each other. In this embodiment, the plurality of single solid color pictures include a red picture, a green picture, a blue picture, and a white picture, and each of the red picture, the green picture, and the blue picture has a 10-bit color depth.

Please continue referring to FIG. 1. The optical sensor 4 is attached to a side surface of a screen of the display device 1. In order to more clearly show relations among the optical sensor 4, the external control device 5, and the display device 1 in the white balance adjusting system of the present application, the optical sensor 4 is particularly shown in FIG. 1 independently. The optical sensor 4 is configured to measure brightness and chroma data of the screen according to the test pattern 220 displayed on the screen of the display device 1. The external control device 5 may be a smart device such as a computer.

Please refer to FIG. 1 in combination with FIG. 2. In using the white balance adjusting system for the display device of the present application, white balance adjustment is implemented by using the external control device 5 to control the control member 21 to execute the white balance control commands, according to the preset white balance lookup table and the brightness and chroma data of the screen, so that a corrected white balance lookup table 202 is produced, wherein the corrected white balance lookup table 202 is stored in the first storage element 3 and is written to the second storage element 23 through the first storage element 3, thereby to update the preset white balance lookup table 201 stored in the register 210. That is, the white balance adjusting system for the liquid crystal display device of the present application can be used to directly adjust white balance of the display device through the external control device 5 without additionally using a conventional external pattern generator (not shown). Furthermore, the preset white balance lookup table 201 instantly updated by the corrected white balance lookup table 202 allows the corrected white balance lookup table 202 to be applicable to a display device as being adjusted now. In this manner, not only accuracy of white balance adjustment is improved, but also time spent on adjustment is reduced.

Figure 3:
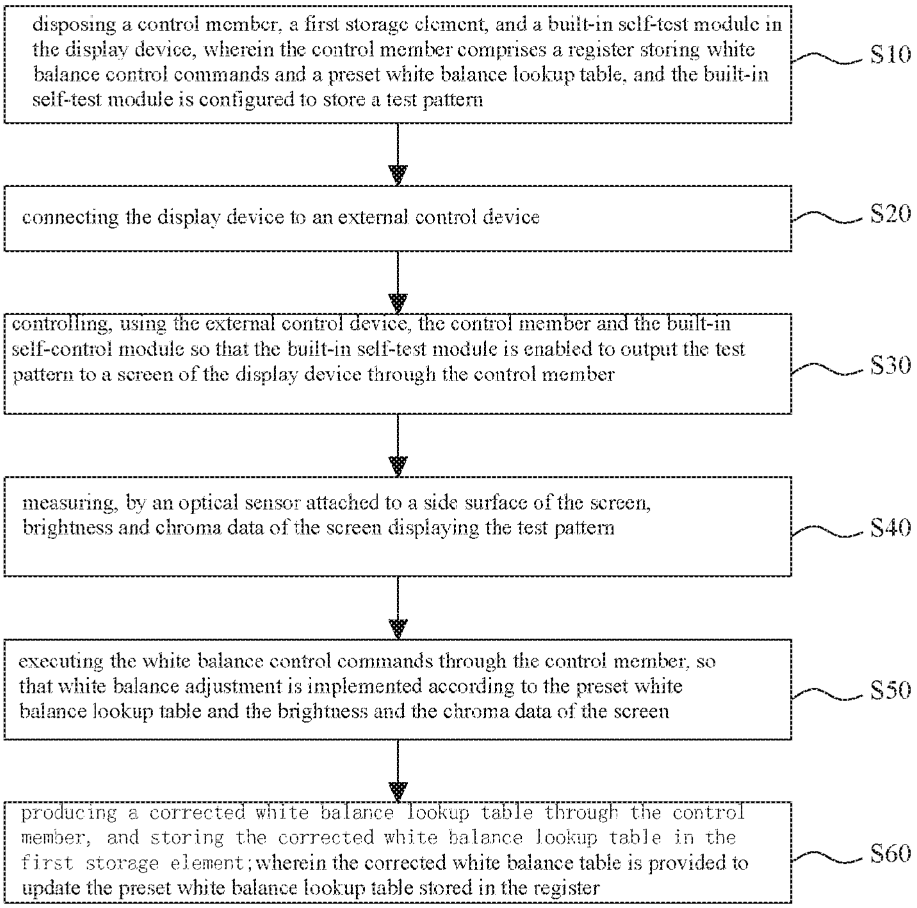
FIG. 3 is a flowchart of a white balance adjusting system for a display device of an embodiment of the present application.

FIG. 3 is a flowchart of a white balance adjusting system for a display device of an embodiment of the present application. The present application further provides a white balance adjusting method for a display device to overcome a problem of uneven brightness (Mura) of a screen of a display device. It should be noted that structural components for implementing the white balance adjustment method of the present application has been disclosed in the white balance adjusting system of the foregoing embodiments, and will not be described again herein.

As shown in FIG. 3, the white balance adjusting method for the display device of the present application includes steps S10-S60, of which detailed description is as follows:

Step S10: disposing a control member, a first storage element, and a built-in self-test module in the display device, wherein the control member includes a register storing white balance control commands and a preset white balance lookup table, and the built-in self-test module is configured to store a test pattern.

Step S20: connecting the display device to an external control device.

Step S30: controlling, using the external control device, the control member and the built-in self-control module so that the built-in self-test module is enabled to output the test pattern to a screen of the display device through the control member.

Step S40: measuring, using an optical sensor attached to a side surface of the screen, brightness and chroma data of the screen displaying the test pattern, wherein the test pattern includes a plurality of single solid color pictures each have a gray level different from each other. In this embodiment, the plurality of single solid color pictures include a red picture, a green picture, a blue picture, and a white picture, and each of the red picture, the green picture, and the blue picture has a 10-bit color depth.

Step S50: executing the white balance control commands through the control member, so that white balance adjustment is implemented according to the preset white balance lookup table and the brightness and the chroma data of the screen.

Step S60: producing a corrected white balance lookup table through the control member, and storing the corrected white balance lookup table in the first storage element, wherein the corrected white balance table is provided to update the preset white balance lookup table stored in the register.

Particularly, the white balance control commands are I2C control commands, which can be formulated by the micro control unit 24. In this embodiment, the white balance control commands include: turning on or turning off white balance adjustment functions; reading out the preset white balance lookup table in the register; adjusting a gray level of the test pattern output by the control member; writing the corrected white balance lookup table to the second storage element; storing the corrected white balance lookup table of the second storage element to the register, so that the preset white balance lookup table in the register is updated with the corrected white balance lookup table; and writing the corrected white balance lookup table updated in the register to the first storage element.

As shown in FIGS. 1 and 2, based on the white balance adjusting system and the white balance adjusting method for the display device of the present application, a solid color picture is output by the control member 21 (i.e. TCON chip) of the control module 2 (i.e. TCON) under control of the external control device, and the built-in self-test module 22, and so on, to be measured by the optical sensor 4, so that gray levels of a red picture, a green picture, and a blue picture of the test pattern can be adjusted according to the preset white balance lookup table, thereby to produce the corrected white balance lookup table replacing the preset white balance lookup table as originally provided, and enabling a more accurate white balance adjustment. Particularly, a conventional pattern generator (PG) is not needed in the white balance adjusting system of the present application to output a specific pattern for measurement, so that the white balance adjusting system can be simplified, hardware costs can be reduced, time spent on adjustment can be reduced, and the white balance adjusting system can further be introduced to production lines, so that white balance adjustment can be performed on each of display panels of different models, no longer limited to a same model only suitable for a unique white balance lookup table, thus ensuring display quality of each of the display panels.

Accordingly, although the present invention has been disclosed as a preferred embodiment, it is not intended to limit the present invention. Those skilled in the art without departing from the spirit and scope of the present invention may make various changes or modifications, and thus the scope of the present invention should be after the appended claims and their equivalents.

What is claimed is:

1. A white balance adjusting system for a display device, the white balance adjusting system connected to an external control device and comprising:

a control member disposed in the display device, wherein the control member comprises a register storing white balance control commands and a preset white balance lookup table;

a built-in self-test module coupled to the control member and configured to store a test pattern;

a first storage element disposed in the display device;

a second storage element and an optical sensor attached to a side surface of a screen of the display device and configured to measure brightness and chroma data of the screen according to the test pattern;

wherein the external control device is operated by the control member to execute the white balance control commands so that white balance adjustment is implemented according to the preset white balance lookup table and the brightness and the chroma data of the screen, so that a corrected white balance lookup table is produced, wherein the corrected white balance lookup table is stored in the first storage element, written to the second storage element through the first storage element, and provided to update the preset white balance lookup table stored in the register.

2. The white balance adjusting system for the display device of claim 1, wherein the control member is a timing controller chip, the first storage element is a flash memory or an electrically erasable programmable read only memory, and the second storage element is a static random-access memory.

3. The white balance adjusting system for the display device of claim 1, wherein the test pattern stored in the built-in self-test module comprises a plurality of single solid color pictures each have a gray level different from each other and fully fill the screen.

4. The white balance adjusting system for the display device of claim 3, wherein the plurality of single solid color pictures comprise a red picture, a green picture, a blue picture, and a white picture.

5. The white balance adjusting system for the display device of claim 4, wherein each of the red picture, the green picture, and the blue picture has a 10-bit color depth.

6. A white balance adjusting method for a display device, comprising:

disposing a control member, a first storage element, a second storage element, and a built-in self-test module in the display device, wherein the control member is a timing controller chip and comprises a register storing white balance control commands and a preset white balance lookup table, and the built-in self-test module is configured to store a test pattern;

connecting the display device to an external control device;

controlling, using the external control device, the control member and the built-in self-control module so that the built-in self-test module is enabled to output the test pattern to a screen of the display device through the control member;

measuring, using an optical sensor attached to a side surface of the screen, brightness and chroma data of the screen displaying the test pattern;

executing the white balance control commands through the control member, so that white balance adjustment is implemented according to the preset white balance lookup table and the brightness and the chroma data of the screen; and producing a corrected white balance lookup table through the control member, and storing the corrected white balance lookup table in the first storage element;

wherein the corrected white balance table is written to the second storage element through the first storage element and is provided to update the preset white balance lookup table stored in the register.

7. The white balance adjusting method for the display device of claim 6, wherein the white balance control commands comprise:

turning on or turning off white balance adjustment functions;

reading out the preset white balance lookup table in the register;

adjusting a gray level of the test pattern output by the control member;

writing the corrected white balance lookup table to the second storage element;

storing the corrected white balance lookup table of the second storage element to the register, so that the preset white balance lookup table in the register is updated with the corrected white balance lookup table; and writing the corrected white balance lookup table updated in the register to the first storage element.

8. The white balance adjusting method for the display device of claim 6, wherein the test pattern stored in the built-in self-test module comprises a plurality of single solid color pictures each have a gray level different from each other and fully fill the screen, wherein the plurality of single solid color pictures comprise a red picture, a green picture, a blue picture, and a white picture.

* * * * *